United States Patent
Tomiyama

(10) Patent No.: US 9,531,417 B2
(45) Date of Patent: Dec. 27, 2016

(54) RECEIVING CIRCUIT, RECEIVING DEVICE, AND RECEIVING METHOD

(71) Applicant: Sony Corporation, Tokyo (JP)

(72) Inventor: Hitoshi Tomiyama, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/201,077

(22) Filed: Mar. 7, 2014

(65) Prior Publication Data

US 2014/0273903 A1 Sep. 18, 2014

(30) Foreign Application Priority Data

Mar. 14, 2013 (JP) ................................. 2013-051988

(51) Int. Cl.
| | |
|---|---|
| *H04B 1/06* | (2006.01) |
| *H04B 1/16* | (2006.01) |
| *H04B 1/04* | (2006.01) |
| *H04B 1/18* | (2006.01) |

(52) U.S. Cl.
CPC .......... *H04B 1/1638* (2013.01); *H04B 1/0458* (2013.01); *H04B 1/18* (2013.01)

(58) Field of Classification Search
CPC ........ H04B 1/1638; H04B 1/0458; H04B 1/18
USPC .............. 455/552.1, 550.1, 130, 131, 168.1, 169.1,455/180.3, 190.1, 193.1, 193.2, 208, 236.1,455/248.1, 260, 323, 256
See application file for complete search history.

(56) References Cited

U.S. PATENT DOCUMENTS

| | | | | |
|---|---|---|---|---|
| 7,084,709 B1* | 8/2006 | Leong | ..................... | H03L 7/087 327/156 |
| 8,818,309 B2* | 8/2014 | Li et al. | ..................... | 455/192.1 |
| 2010/0048155 A1* | 2/2010 | Wang | .................. | H04B 1/1027 455/234.1 |
| 2010/0105425 A1* | 4/2010 | Asokan | .................. | H04B 1/406 455/552.1 |
| 2010/0302100 A1* | 12/2010 | Yang et al. | .............. | 342/357.73 |

FOREIGN PATENT DOCUMENTS

JP 2009-092473 4/2009

* cited by examiner

*Primary Examiner* — Tuan Pham
(74) *Attorney, Agent, or Firm* — Chip Law Group

(57) ABSTRACT

A receiving circuit includes: a mixing section configured to mix a local oscillation signal with a positioning signal that is received by an antenna within a constant receiving frequency band that includes a resonance frequency of the antenna, and output a mixed signal of the local oscillation signal and the positioning signal; and a control section configured to sequentially select any of a plurality of carrier frequency bands used in the positioning signal, and configured to switch the resonance frequency of the antenna to a specific frequency within the selected carrier frequency band, and switch a frequency of the local oscillation signal, based on the specific frequency and a frequency of the mixed signal.

16 Claims, 12 Drawing Sheets

| TYPE OF GNSS | BAND OF CARRIER FREQUENCY Frf | IMPEDANCE (CAPASITIVE REACTANCE) | LOCAL OSCILLATION FREQUENCY Flo | SIGNAL PROCESSING ALGORITHM |
|---|---|---|---|---|
| GPS | 1573.374~1577.466[MHz] | Xc1 | 1575.42[MHz] | ALGORITHM 1 |
| GLONASS | 1597.552~1605.886[MHz] | Xc2 | 1601.70[MHz] | ALGORITHM 2 |
| COMPASS | 1559.052~1563.144[MHz] | Xc3 | 1561.00[MHz] | ALGORITHM 3 |

FIG. 5

RECEIVING CIRCUIT, RECEIVING DEVICE, AND RECEIVING METHOD

CROSS REFERENCE TO RELATED APPLICATIONS

This application claims the benefit of Japanese Priority Patent Application JP2013-51988 filed Mar. 14, 2013, the entire contents of which are incorporated herein by reference.

BACKGROUND

The present technology relates to a receiving circuit, a receiving device, and a receiving method. Specifically, the present technology relates to a receiving circuit, a receiving device, and a receiving method of receiving a positioning signal from a satellite.

Global Navigation Satellite System (GNSS) is known as a system that receives radio waves from a plurality of satellites and determines a position and a speed of a receiver. The GNSS is represented by Global Positioning System (GPS) operated by the United States. Besides the GPS, various other types of systems have been developed and operated. Examples of other types may include COMPASS developed by China, and GLONASS (GLObal NAvigation Satellite System) operated by Russia. Although these systems are different in terms of specification such as a frequency band to be used, these systems adopt a common positioning principle of calculating the position of a receiver based on a distance from each of a plurality of satellites to the receiver.

In order to perform high-precision positioning based on this positioning principle, at least four visible satellites (navigation satellites in an open range in the air) are necessary to determine four unknown numbers including three-dimensional coordinates (x, y, z) of a receiver and an error in a clock. However, in urban areas with many obstacles that block radio waves, the number of visible satellites may be small. Therefore, there has been proposed a receiving device in which a positioning signal from a satellite in the GPS and a positioning signal from a satellite in a system other than the GPS (such as the GLONASS) are simultaneously received by a single antenna (for example, see Japanese Unexamined Patent Application Publication No. 2009-92473).

This receiving device includes two circuits each configured of a mixer, a filter, an amplifier, and the like, and receives signals in different frequency bands with the respective circuits. With this, the receiving device is allowed to receive a plurality of signals in different frequency bands. By being configured to receive signals in a plurality of frequency bands, the receiver is allowed to have the larger number of visible satellites than that in a case where a signal in only one frequency band is received. As a result, positioning accuracy improves.

In addition, the receiving device thus performing the positioning is more convenient when it is smaller, and therefore it is expected to reduce the circuit scale of the receiving device. Moreover, it is necessary to receive positioning signals continuously to measure the position by following the movement of the receiving device, and therefore it is expected to reduce power consumption.

SUMMARY

However, in the above-described existing technology, it is difficult to reduce the power consumption and the circuit scale. The above-described receiving device includes the mixer, the filter and the amplifier for each frequency band. In this receiving device, it is necessary to mix a local oscillation signal of a different frequency with a positioning signal by providing the mixer for each frequency band, and therefore it is difficult to reduce the mixers. It is possible to reduce the filters and the amplifiers, but when these are reduced, performance such as receiving sensitivity drops, leading to a decline in positioning accuracy, which is disadvantageous.

It is desirable to reduce power consumption and a circuit scale in a receiving circuit or a receiving device that receives a plurality of signals in different frequency bands.

According to an embodiment of the present technology, there is provided a receiving circuit including: a mixing section configured to mix a local oscillation signal with a positioning signal that is received by an antenna within a constant receiving frequency band that includes a resonance frequency of the antenna, and output a mixed signal of the local oscillation signal and the positioning signal; and a control section configured to sequentially select any of a plurality of carrier frequency bands used in the positioning signal, and configured to switch the resonance frequency of the antenna to a specific frequency within the selected carrier frequency band, and switch a frequency of the local oscillation signal, based on the specific frequency and a frequency of the mixed signal. With this, the resonance frequency of the antenna is switched to the specific frequency within the selected carrier frequency band, and the frequency of the local oscillation signal is also switched based on the specific frequency and the frequency of the mixed signal.

According to an embodiment of the present technology, there is provided a receiving method including: mixing, by a mixing section, a local oscillation signal with a positioning signal that is received by an antenna within a constant receiving frequency band that includes a resonance frequency of the antenna, and outputting a mixed signal of the local oscillation signal and the positioning signal; and performing control, by a control section, of sequentially selecting any of a plurality of carrier frequency bands used in the positioning signal, and switching the resonance frequency of the antenna to a specific frequency within the selected carrier frequency band, and switching a frequency of the local oscillation signal, based on the specific frequency and a frequency of the mixed signal. With this, the resonance frequency of the antenna is switched to the specific frequency within the selected carrier frequency band, and the frequency of the local oscillation signal is also switched based on the specific frequency and the frequency of the mixed signal.

Advantageously, a baseband section may be further included that may be configured to generate, based on the mixed signal, positional information indicating a position of the receiving circuit, when a phase of the local oscillation signal is synchronized with a predetermined reference phase, and the mixing section may mix the positioning signal with the local oscillation signal in which the phase of the local oscillation signal is synchronized with the predetermined reference phase, and output the mixed signal of the local oscillation signal having the synchronized phase and the positioning signal. With this, the positional information is generated when the phase of the local oscillation signal is synchronized with the reference phase.

Advantageously, the baseband section may estimate, based on orbital data of a satellite and a current time, a quantity of visible satellites for each of the carrier frequency bands, and the control section may select the carrier frequency band for the visible satellites whose quantity is large, by giving a higher priority thereto than to the carrier frequency band for the visible satellites whose quantity is small. With this, the carrier frequency band for the visible satellites whose quantity is large is selected preferentially.

Advantageously, the control section may change an impedance of the antenna to switch the resonance frequency of the antenna. With this, the resonance frequency of the antenna is switched by changing the impedance of the antenna.

Advantageously, the impedance may include one or both of capacitive reactance and inductive reactance. With this, the resonance frequency of the antenna is switched by changing one or both of the capacitive reactance and the inductive reactance of the antenna.

Advantageously, the mixing section may allow the mixed signal to pass through a low pass filter that cuts off a frequency component higher than a cut-off frequency, and output thereafter the mixed signal having passed through the low pass filter, and the control section may switch the resonance frequency of the antenna and switch the frequency of the local oscillation signal, and further switch the cut-off frequency to a higher value for a wider bandwidth of the selected carrier frequency band. With this, the cut-off frequency is switched to such a value that the wider the selected carrier frequency band is, the higher the value is.

Advantageously, a holding section may be further included that may be configured to hold, each time the carrier frequency band corresponding to the mixed signal is selected, any of a plurality of pieces of divisional data, the plurality of pieces of divisional data being a division of unit data in the mixed signal, and the baseband section may acquire the unit data, based on each of the pieces of divisional data held in the holding section, to generate the positional information. With this, the positional information is generated based on the unit data acquired using each of the divisional data.

Advantageously, a holding section may be further included that may be configured to hold, for each of the carrier frequency bands, a plurality of pieces of divisional data, the plurality of pieces of divisional data being a division of unit data in the mixed signal, and the baseband section may acquire the unit data for each of the carrier frequency bands, based on each of the pieces of divisional data held in the holding section, to generate the positional information. With this, the unit data is generated for each of the carrier frequency bands.

Advantageously, a frequency conversion section may be further included that may be configured to convert the frequency of the mixed signal. With this, the frequency of the mixed signal is further converted.

According to an embodiment of the present technology, there is provided a receiving device including: a mixing section configured to mix a local oscillation signal with a positioning signal that is received by an antenna within a constant receiving frequency band that includes a resonance frequency of the antenna, and output a mixed signal of the local oscillation signal and the positioning signal; and a control section configured to sequentially select any of a plurality of carrier frequency bands used in the positioning signal, and configured to switch the resonance frequency of the antenna to a specific frequency within the selected carrier frequency band, and switch a frequency of the local oscillation signal, based on the specific frequency and a frequency of the mixed signal. With this, the resonance frequency of the antenna is switched to the specific frequency within the selected carrier frequency band, and the frequency of the local oscillation signal is also switched based on the specific frequency and the frequency of the mixed signal.

Advantageously, the control section may include: a frequency control section configured to switch the resonance frequency of the antenna and switch the frequency of the local oscillation signal; and a baseband processing section configured to generate positional information indicating a position of the receiving device, based on the mixed signal. With this, the positional information is generated based on the mixed signal.

Advantageously, the mixing section may mix the positioning signal with the local oscillation signal in which the phase of the local oscillation signal is synchronized with the predetermined reference phase, and output the mixed signal of the local oscillation signal having the synchronized phase and the positioning signal, and the baseband processing section may generate, based on the mixed signal, the positional information indicating the position of the receiving device, when the phase of the local oscillation signal is synchronized with the predetermined reference phase. With this, the positional information is generated when the phase of the local oscillation signal is synchronized with the reference phase.

Advantageously, the baseband processing section may estimate, based on orbital data of a satellite and a current time, a quantity of visible satellites for each of the carrier frequency bands, and the control section may select the carrier frequency band for the visible satellites whose quantity is large, by giving a higher priority thereto than to the carrier frequency band for the visible satellites whose quantity is small. With this, the carrier frequency band for the visible satellites whose quantity is large is selected preferentially.

Advantageously, a holding section may be further included that may be configured to hold, each time the carrier frequency band corresponding to the mixed signal is selected, any of a plurality of pieces of divisional data, the plurality of pieces of divisional data being a division of unit data in the mixed signal, and the baseband processing section may acquire the unit data, based on each of the pieces of divisional data held in the holding section, to generate the positional information. With this, the positional information is generated based on the unit data acquired using each of the divisional data.

Advantageously, a holding section may be further included that may be configured to hold, for each of the carrier frequency bands, a plurality of pieces of divisional data, the plurality of pieces of divisional data being a division of unit data in the mixed signal, and the baseband processing section may acquire the unit data for each of the carrier frequency bands, based on each of the pieces of divisional data held in the holding section, to generate the positional information. With this, the unit data is generated for each of the carrier frequency bands.

Advantageously, the receiving device may include the antenna. With this, the positioning signal is received by the antenna.

According to the above-described embodiments of the present technology, power consumption and a circuit scale are allowed to be reduced in the receiving circuit or the receiving device that receives a plurality of signals in different frequency bands.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to describe the principles of the technology.

FIG. 5 is a diagram illustrating an example of control contents for each frequency band in the first embodiment.

DETAILED DESCRIPTION

Some embodiments of the present technology will be described below with reference to the drawings. The description will be provided in the following order.
1. First embodiment (an example of switching a resonance frequency and a local oscillation frequency time-divisionally)
2. Second embodiment (an example of switching a resonance frequency and a local oscillation frequency time-divisionally, and holding data of positioning signal by dividing the data)
3. Third embodiment (an example of switching a resonance frequency and a local oscillation frequency time-divisionally, and performing conversion to an intermediate frequency)
4. Fourth embodiment (an example in which a baseband section switches a resonance frequency and a local oscillation frequency time-divisionally, in a receiving device)
[1. First Embodiment]
[Configuration Example of Receiver]

Figure 1:
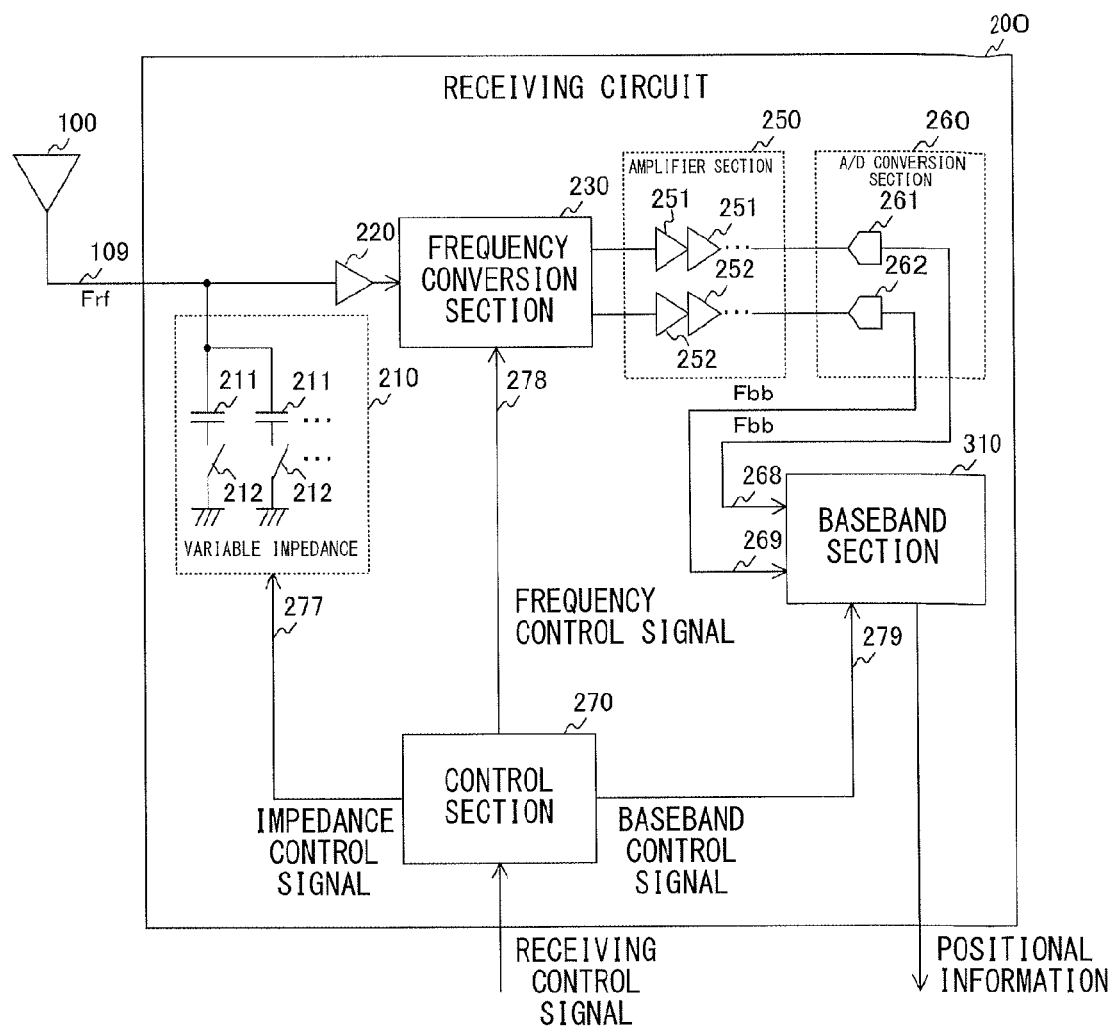
FIG. 1 is a block diagram illustrating a configuration example of a receiving circuit in a first embodiment.

FIG. 1 is a block diagram illustrating a configuration example of a receiver in a first embodiment. This receiver includes an antenna 100 and a receiving circuit 200.

The antenna 100 resonates with a frequency of a radio wave from a satellite and converts the radio wave to an electric signal (i.e., receives an electric signal). This electric signal carries data necessary to measure the position of the receiver. Hereinafter, this electric signal will be referred to as "positioning signal", and the frequency of the positioning signal will be referred to as "carrier frequency". The antenna 100 supplies the received positioning signal to the receiving circuit 200, through a signal line 109.

Here, the receiver including the antenna 100 and the receiving circuit 200 is assumed to receive a positioning signal in each of a plurality of GNSSs of different frequency bands. For example, a positioning signal in each of GPS, GLONASS, and COMPASS may be received. It is to be noted that the receiver may receive a positioning signal in each of systems whose quantity is other than three. Further, the combination of GNSSs is not limited to GPS, GLONASS, and COMPASS. For example, the receiver may receive a positioning signal of each of GPS and Galileo, or a positioning signal of each of GPS and QZSS (Quasi-Zenith Satellite System). Galileo is a GNSS developed by the European Union, and QZSS is a GNSS developed by Japan.

Furthermore, the receiver may receive a positioning signal in each of a plurality of carrier frequency bands in one system. For example, L1 and L5 bands and the like of different frequency bands may be used in GPS. The L1 band is a widely-used commercial frequency band, and the receiver of FIG. 1 also is assumed to receive a positioning signal in the L1 band. On the other hand, the L5 band has a bandwidth wider than that of the L1 band, and is used for higher precise positioning than that of the L1 band. The receiver may receive signals in these L1 and L5 bands and the like.

The receiving circuit 200 generates positional information from the positioning signal. The receiving circuit 200 includes a variable impedance 210, a low-noise amplifier circuit 220, a frequency conversion section 230, an amplifier section 250, an A/D (Analog to Digital) conversion section 260, a control section 270, and a baseband section 310.

The variable impedance 210 is an impedance connected to an antenna, and has capacitive reactance that is varied according to control of the control section 270. The variable impedance 210 includes a plurality of circuits each having a capacitor 211 and a switch 212. One end of each of the capacitors 211 is connected to the antenna 100, and the other end is connected to the corresponding switch 212. One end of each of the switches 212 is connected to the corresponding capacitor 211, and the other end is grounded. Further, the switch 212 is opened and closed according to the control of the control section 270. The switch 212 may desirably have low resistance and low parasitic capacitance. A value of the capacitive reactance ($=1/\omega C$) of the impedance of the antenna is altered by controlling the switch 212. Here, "$\omega$" is an angular velocity, and "C" is a synthetic capacity in which capacities of the respective capacitors 211 are synthesized.

When an inductance of the antenna 100 is assumed to be L, for example, a relationship expressed by the following expression 1 may be established between a resonance frequency $f_R$ of the antenna 100, and the inductance L as well as the synthetic capacity C. Here, the unit of the resonance frequency $f_R$ may be, for example, Hertz (Hz). In addition, the unit of the inductance L may be, for example, Henry (H), and the unit of the synthetic capacity C may be, for example, farad (F).

[Expression 1]

$$f_R = \frac{1}{2\pi\sqrt{LC}} \qquad 1$$

As illustrated by way of example in FIG. 1, the variable impedance 210 including the plurality of capacitors connected in parallel is also referred to as a capacitor bank. It is to be noted that, in place of such a capacitor bank, a variable capacitance diode or the like may be connected to the antenna 100 as the variable impedance 210. Further, although the capacitive reactance is assumed to be variable, inductive reactance may be variable, or both the capacitive reactance and the inductive reactance may be variable. Furthermore, although the variable impedance 210 is configured to be incorporated in the receiving circuit 200, the variable impedance 210 may be provided outside the receiving circuit 200 (for example, in proximity to the antenna 100).

The low-noise amplifier circuit 220 is a LNA (Low Noise Amplifier) that amplifies the positioning signal from the antenna 100, with low noise, and supplies the amplified positioning signal to the frequency conversion section 230.

The frequency conversion section 230 converts the carrier frequency of the positioning signal to a lower frequency (i.e. performs down conversion), according to the control of the control section 270. Specifically, the frequency conversion section 230 generates a local oscillation signal, and mixes the generated local oscillation signal with the positioning signal. Assume the frequency of the positioning signal after the mixture is a baseband frequency Fbb, the carrier frequency is Frf, and a local oscillation frequency of the local oscillation signal is Flo. Then, for example, a relationship expressed by the following expression 2 may be established between these frequencies. The unit of these frequencies may be, for example, Hertz (Hz).

$$Frf-Flo=Fbb \qquad 2$$

In other words, the frequency of the positioning signal is converted to the baseband frequency Fbb by the mixture.

A system of thus performing direct conversion to the baseband frequency Fbb without performing conversion to an intermediate frequency is called a direct conversion system. The frequency conversion section 230 supplies the amplifier section 250 with the positioning signal whose frequency has been converted (in other words, a baseband signal).

It is to be noted that, the frequency conversion section 230 is a specific but not limitative example of "mixing section" in one embodiment of the present technology.

The amplifier section 250 amplifies the positioning signal, and supplies the amplified positioning signal to the A/D conversion section 260. The amplifier section 250 includes a plurality of stages of amplifiers 251. Each of the amplifiers 251 amplifies an input signal and supplies the amplified signal to the next stage. The down-converted positioning signal is amplified by the amplifiers 251 to the extent that a quantization noise level in the A/D conversion section 260 is sufficiently lower than a signal level.

The A/D conversion section 260 converts the positioning signal which is analog, to a digital signal, and supplies the digital signal to the baseband section 310. The A/D conversion section 260 includes A/D converters 261 and 262. The A/D converter 261 performs AD conversion of an analog I signal, and supplies the converted signal to the baseband section 310. The A/D converter 262 performs AD conversion of an analog Q signal, and supplies the converted signal to the baseband section 310. Here, the I signal is a signal of an in-phase component of the positioning signal, and the Q signal is a signal of a quadrature component of the positioning signal. The baseband section 310 determines the position of the receiver based on the positioning signal, according to the control of the control section 270.

The control section 270 controls the variable impedance 210, the frequency conversion section 230, and the baseband section 310. The control section 270 receives, from outside of the receiving circuit 200, a receiving control signal that orders the control section 270 to start or end receiving. When being ordered to start receiving, the control section 270 sequentially selects any one of the carrier frequency bands of GPS, GLONASS, and COMPASS, as a target to be received. For example, the control section 270 may assign a time slot of a fixed length to each of the carrier frequency bands beforehand, and select, in the time slot corresponding to the current time, the carrier frequency band corresponding to that time slot.

Subsequently, the control section 270 switches the resonance frequency $f_R$ of the antenna 100 to a specific frequency (for example, a center frequency) within the selected frequency band. Specifically, the control section 270 switches the resonance frequency $f_R$ by controlling the variable impedance 210 based on an impedance control signal. The impedance control signal is supplied through a signal line 277.

As described above, the relationship of the expression 1 may be established between the synthetic capacity C of the variable impedance 210, and the resonance frequency $f_R$. Therefore, the synthetic capacity C is controlled so that the resonance frequency $f_R$ becomes the center frequency of the selected carrier frequency band. With this, the positioning signal of the carrier frequency band to be received is allowed to be received by the antenna 100 with high sensitivity.

Here, if the resonance frequency of the antenna 100 is a fixed value, it is necessary to widen a receiving frequency band of the antenna 100 to the extent of covering almost all the carrier frequency bands of GPS, GLONASS, and COMPASS. However, in general, as the gain of an antenna is increased for higher sensitivity, the receiving frequency band of the antenna tends to become narrow, and also, the resonant impedance of the antenna tends to become higher. For this reason, when the resonance frequency of the antenna 100 is a fixed value, it is necessary to widen the receiving frequency band, and therefore it is difficult to achieve higher sensitivity.

In contrast, in a configuration in which the resonance frequency of the antenna 100 is switched depending on the carrier frequency band to be received, the receiving frequency band of the antenna 100 may be in a narrow range to the extent of covering the carrier frequency band of one GNSS. Therefore, the antenna 100 is allowed to receive a positioning signal with higher sensitivity, than that in the case in which the gain is increased and the resonance frequency is fixed.

Further, the control section 270 switches the resonance frequency of the antenna 100, and also switches the local oscillation frequency Flo to a value of a difference between the center frequency of the carrier frequency band and the baseband frequency Fbb, by controlling the frequency conversion section 230 based on a frequency control signal. The frequency control signal is supplied through a signal line 278. This maintains the baseband frequency Fbb substantially constant based on the relationship of the expression 2, even if the carrier frequency band is switched.

Furthermore, the control section 270 switches the resonance frequency of the antenna 100, and also switches an algorithm used by the baseband section 310, by controlling the baseband section 310 based on a baseband control signal. The baseband control signal is supplied through a signal line 279. The algorithm will be described later in detail.

[Configuration Example of Control Section]

Figure 2:
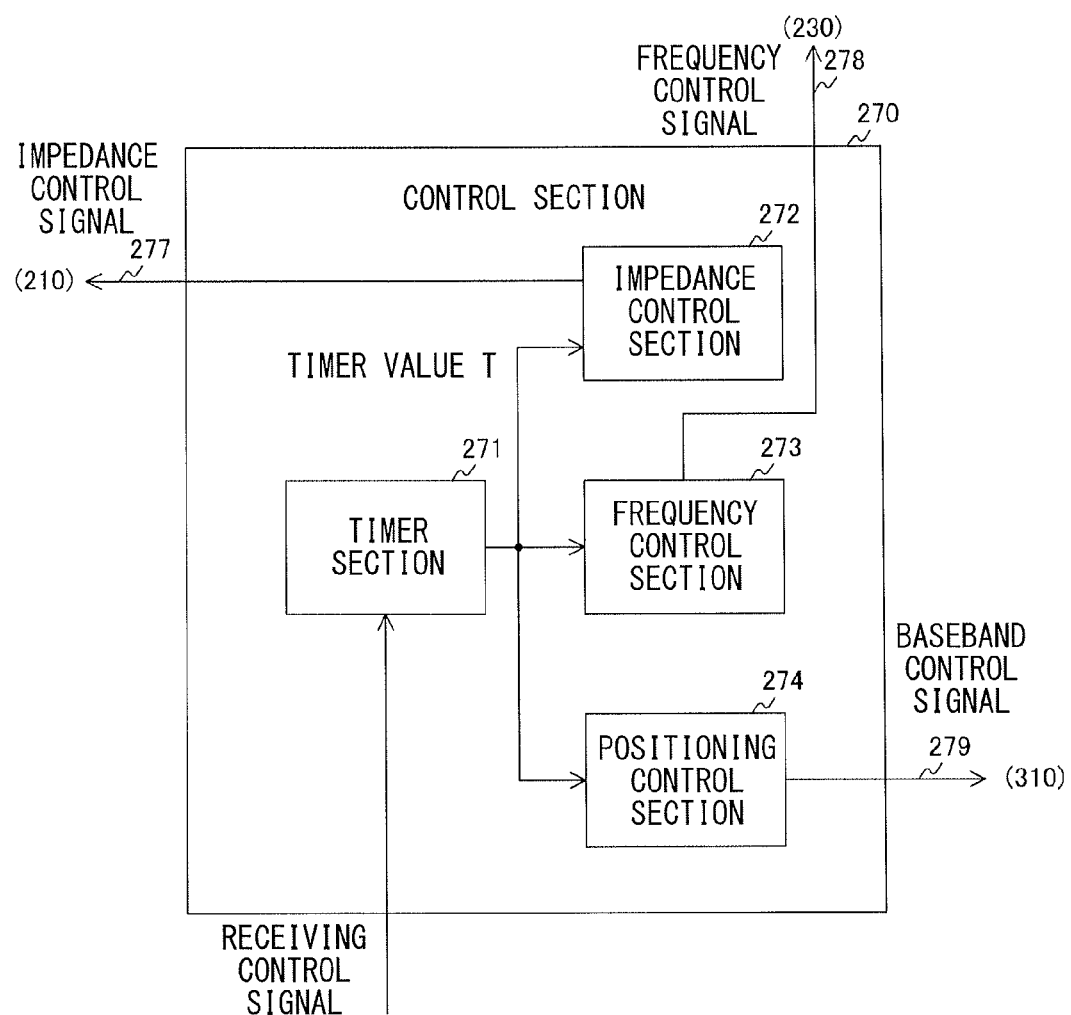
FIG. 2 is a block diagram illustrating a configuration example of a control section in the first embodiment.

FIG. 2 is a block diagram illustrating a configuration example of the control section 270 in the first embodiment. The control section 270 includes a timer section 271, an impedance control section 272, a frequency control section 273, and a positioning control section 274.

The timer section 271 times according to the receiving control signal, and generates a timer value. For example, upon receipt of the receiving control signal that orders start of receiving, the timer section 271 may initialize the timer value and start timing, and upon receipt of the receiving control signal that orders end of the receiving, the timer section 271 may stop timing. The timer section 271 supplies the timer value to the impedance control section 272, the frequency control section 273, and the positioning control section 274.

The impedance control section 272 controls the variable impedance 210 based on the timer value. Specifically, the impedance control section 272 determines whether or not the supplied timer value is a timer value corresponding to the time when the time slot is switched. When the time slot is switched, the impedance control section 272 switches the resonance frequency $f_R$ of the antenna 100 by controlling the variable impedance 210.

The frequency control section 273 controls the frequency conversion section 230 based on the timer value. When the time slot is switched, the frequency control section 273 switches the local oscillation frequency Flo by controlling the frequency conversion section 230.

The positioning control section 274 controls the baseband section 310 based on the timer value. When the time slot is switched, the positioning control section 274 switches the algorithm in the baseband section 310 by controlling the baseband section 310.

[Configuration Example of Frequency Conversion Section]

Figure 3:
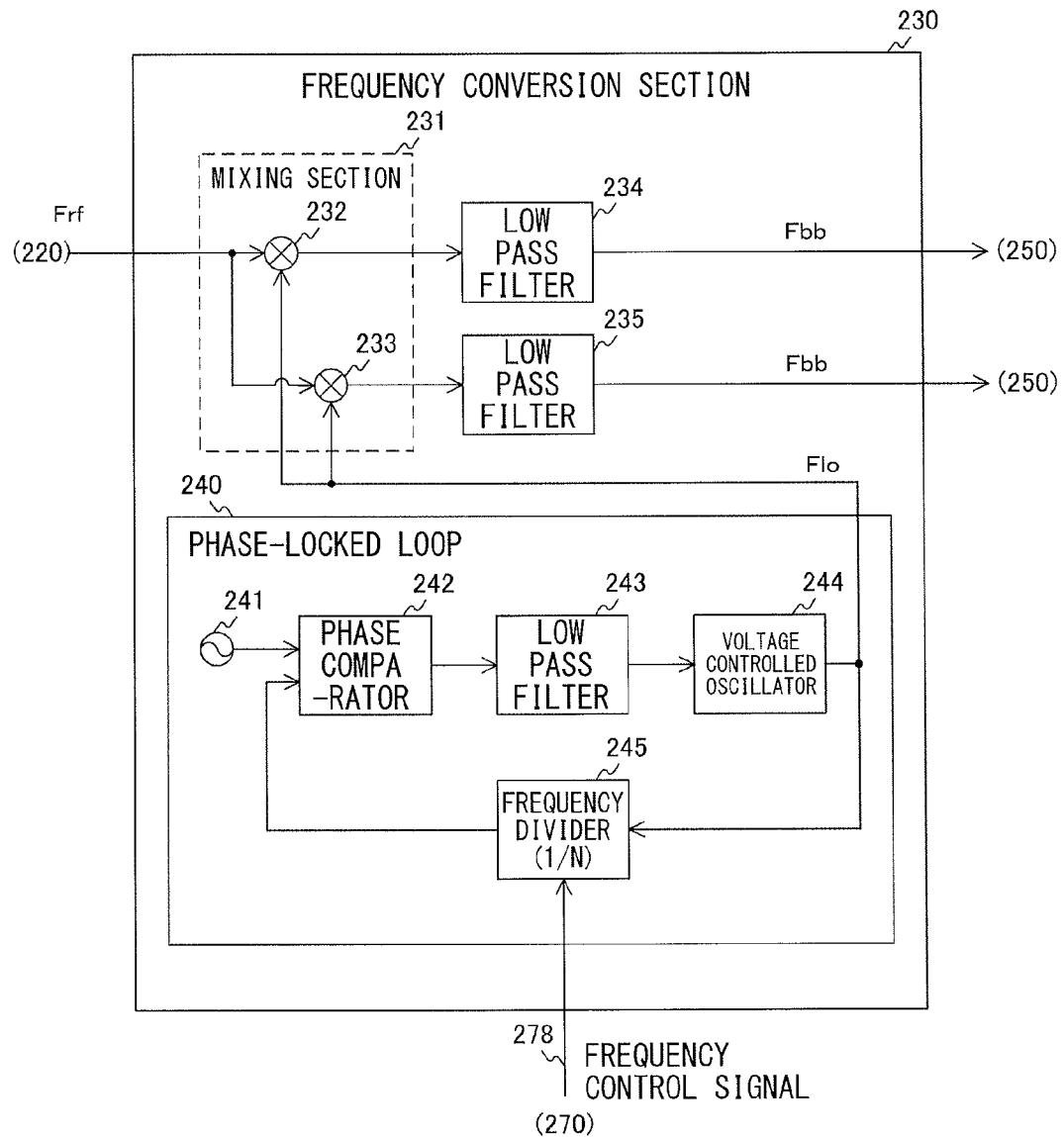
FIG. 3 is a block diagram illustrating a configuration example of a frequency conversion section in the first embodiment.

FIG. 3 is a block diagram illustrating a configuration example of the frequency conversion section 230 in the first embodiment. The frequency conversion section 230 includes a mixing section 231, low pass filters 234 and 235, and a phase-locked loop 240.

The mixing section 231 mixes the positioning signal and the local oscillation signal, thereby converting the frequency of the positioning signal. The mixing section 231 includes mixers 232 and 233. The local oscillation signals different at 90 degrees are supplied to the mixers 232 and 233. A shifter that shifts the phase by 90 degrees is omitted in FIG. 3.

When the frequency of the positioning signal before the conversion is assumed to be the carrier frequency Frf and the frequency of the local oscillation signal is assumed to be the local oscillation frequency Flo, a value of a difference between of these Frf and Flo (=Frf−Flo) is the baseband frequency Fbb of the positioning signal after the conversion, as determined by the expression 2.

For example, assume the carrier frequency Frf is 1573.374 MHz to 1577.466 MHz, and the local oscillation frequency Flo is 1575.42 MHz. In this case, the frequency band of the baseband frequency Fbb after the conversion may be −2.042 MHz to +2.042 MHz.

The mixer 232 generates the I (in-phase component) signal by mixing the local oscillation signal and the positioning signal, and supplies the generated I signal to the low pass filter 234. Further, the mixer 233 generates the Q (quadrature component) signal by mixing the local oscillation signal shifted by 90 degrees and the positioning signal, and supplies the generated Q signal to the low pass filter 235.

The low pass filter 234 allows a component of a frequency lower than a cut-off frequency Fc in the I signal to pass therethrough. The low pass filter 235 allows a component of a frequency lower than the cut-off frequency Fc in the Q signal to pass therethrough. The cut-off frequency Fc is set to allow the passage of the frequency band width of the positioning signal (the I signal and the Q signal) after the frequency conversion. For example, in a case in which a band substantially covering the carrier frequency band of each of three systems is to become a bandwidth of about a few megahertz when being converted, the cut-off frequency Fc of the low pass filters 234 and 235 may be set to about 5 MHz.

It is to be noted that the bandwidths of the carrier frequencies vary among the systems, and therefore the frequency band widths after the conversion also vary among the systems. For this reason, the cut-off frequency Fc of the low pass filters 234 and 235 is set to a value that allows the passage of all of them, but the cut-off frequency Fc may be desirably switched for each system. When the cut-off frequency Fc is switched for each system, the control section 270 further supplies the frequency conversion section 230 with a control signal used to control the filter. Each of the low pass filters 234 and 235 switches the cut-off frequency Fc to such a value that the wider the carrier frequency bandwidth is, the higher the value is, according to the control signal.

The phase-locked loop 240 generates the local oscillation signal, and synchronizes the phase of the generated local oscillation signal to the phase of the reference signal. The frequency band substantially covering the frequency band of each of GPS, GLONASS, and COMPASS is about 1561 MHz to 1602 MHz, which is a wide range. It is necessary that the phase-locked loop 240 operate in this wide range of frequency band. As performance necessary therefore, for example, a CN ratio (Carrier to Noise Ratio) may be about 90 decibel-Hertz (dB-Hz), and a lock-up time may be about 1 millisecond (ms). Here, the lock-up time is the time after the local oscillation frequency of the local oscillation signal is switched and before the phase of this local oscillation signal is synchronized with (i.e. locked to) the phase of the reference signal.

The phase-locked loop 240 includes a reference signal generator 241, a phase comparator 242, a low pass filter 243, a voltage controlled oscillator 244, and a frequency divider 245.

The reference signal generator 241 generates the reference signal of a constant oscillating frequency, and supplies the generated reference signal to the phase comparator 242. As the reference signal generator 241, for example, a crystal oscillator such as a Temperature Compensation Crystal Oscillator (TCXO) may be used. It is to be noted that the reference signal generator 241 may be provided outside the frequency conversion section 230. Further, the frequency of the reference signal is also used as a frequency of a clock used to operate the control section 270 and a CPU in the baseband section 310.

The phase comparator 242 compares the reference signal from the reference signal generator 241 with a phase of a feedback signal from the frequency divider 245, and supplies the low pass filter 243 with a voltage corresponding to a phase difference obtained thereby. The low pass filter 243 allows a component of a frequency lower than a cut-off frequency to pass therethrough. This prevents useless oscillation due to amplification of signal fluctuations in a short period.

The voltage controlled oscillator 244 controls the frequency of a signal, based on a voltage inputted through the low pass filter 243. The voltage controlled oscillator 244 controls the frequency of the signal based on the inputted voltage, and supplies a result to the mixing section 231 as the local oscillation signal. The voltage controlled oscillator 244 also feeds the result back into the frequency divider 245 as the feedback signal.

The frequency divider 245 divides the frequency of the feedback signal. The frequency divider 245 supplies the phase comparator 242 with the feedback signal after dividing the feedback signal by a division ratio N. In addition, the frequency divider 245 switches the division ratio N according to the frequency control signal. The value of the local oscillation frequency Flo is switched by switching the division ratio N. For example, when the frequency of the reference signal is 16.368 MHz, the division ratio N may be controlled to about 96.25, to have the local oscillation frequency Flo of 1575.42 MHz.

Here, the local oscillation frequency Flo is controlled so that the frequency after the conversion becomes the baseband frequency Fbb to be used in the baseband section 310. When the carrier frequency Frf of the positioning signal is switched, the control section 270 switches the local oscillation frequency Flo to be converted to the baseband frequency Fbb, even after the switching of the carrier frequency Frf.

For example, assume a baseband frequency bandwidth of about a few megahertz (for example, −2.042 MHz to +2.042 MHz) is used in the baseband section 310. In this case, when the carrier frequency Frf is 1573.374 MHz to 1577.466 MHz, the local oscillation frequency Flo may be controlled to 1575.42 MHz so that the band after the conversion falls within the baseband frequency bandwidth. Further, when the carrier frequency Frf is switched to 1597.552 MHz to 1605.866 MHz, the local oscillation frequency Flo may be switched to 1601.70 MHz in response to the switching of the carrier frequency.

[Configuration Example of Baseband Section]

Figure 4:
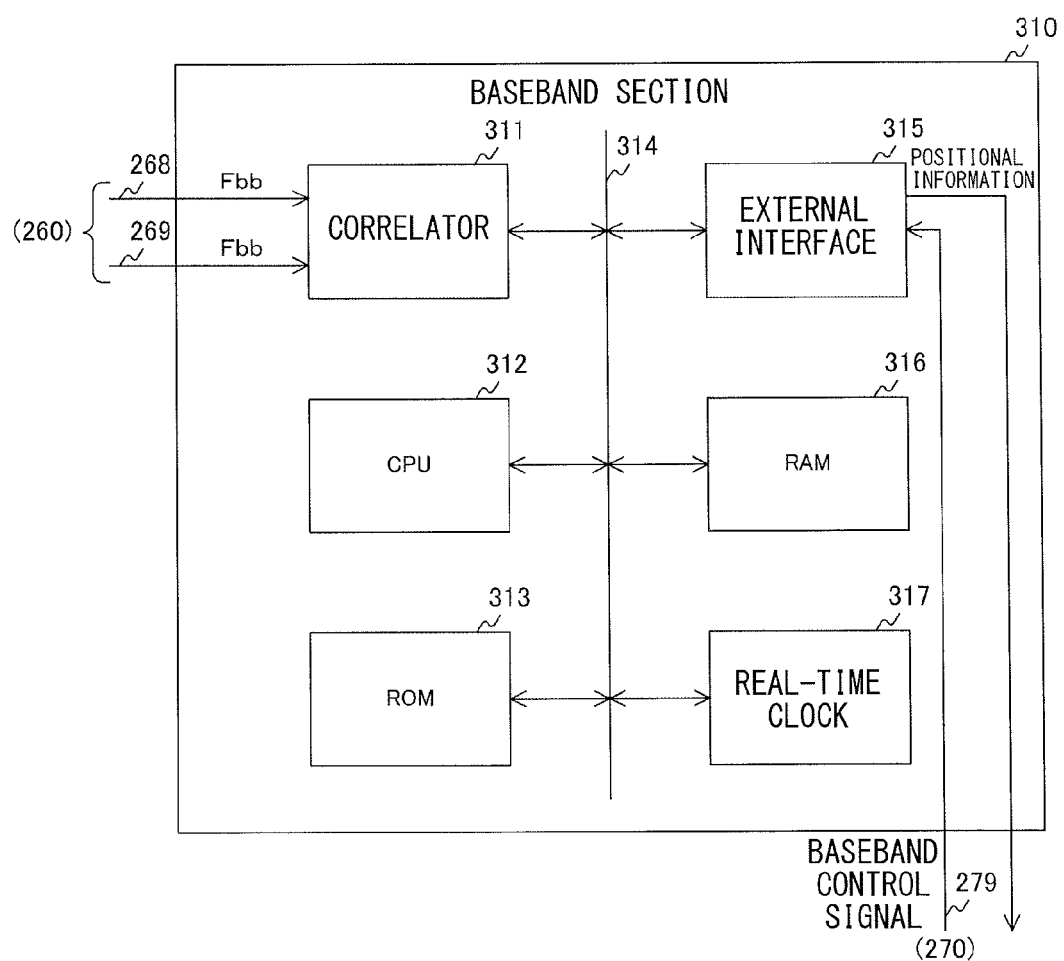
FIG. 4 is a block diagram illustrating a configuration example of a baseband section in the first embodiment.

FIG. 4 is a block diagram illustrating a configuration example of the baseband section 310 in the first embodiment. The baseband section 310 includes a correlator 311, a CPU 312, a ROM 313, a bus 314, an external interface 315, a RAM 316, and a real-time clock 317.

The correlator 311 performs correlation processing of following (i.e. tracking) a satellite. The satellite moves at high speed, and a receiver itself provided with the receiving circuit 200 may also be moved. Therefore, the phase of the positioning signal from the satellite changes constantly, and it is necessary for the baseband section 310 to supplement the positioning signal by following the changes of the phase.

Here, in FIG. 4, only one correlator 311 is illustrated for convenience of description. However, actually, for example, one set of an E (Early) correlator, a P (Punctual) correlator, and an L (Late) correlator may be provided for each satellite. In a case of tracking sixteen satellites, sixteen sets of correlators 311 are provided.

In the correlation processing, the correlator 311 generates a code unique to a satellite to be tracked. The unique cord is a C/A (Coarse/Acquisition) cord in GPS. The correlator 311 outputs a signal at a level corresponding to a degree of phase correlation between the C/A code and the positioning signal (the I signal and the Q signal). The E correlator, the P correlator, and the L correlator output signals based on the C/A codes with phases different from each other.

When an output value of the E correlator is $V_E$, an output value of the P correlator is $V_P$, and an output value of the L correlator is $V_L$, the phase is controlled by the CPU 312 to establish the following expressions 3 to 5.

$$V_E = V_L \qquad \qquad 3$$

$$V_P > V_E \qquad \qquad 4$$

$$V_P > V_L \qquad \qquad 5$$

The satellite is tracked by allowing the CPU 312 to control the phase so as to establish the expressions 3 to 5.

The CPU 312 measures the position and the speed of the receiver provided with the receiving circuit 200. The CPU 312 performs processing of the positioning signal by using the algorithm indicated by the baseband control signal.

The algorithm to be used is partially different depending on the type of GNSS. This is because, the number of satellites as well as orbits thereof, a modulation system of a positioning signal, data structure of a cord superimposed on the positioning signal, a cord length, a coordinate system as well as a time scale to be used, and the like, are different for each system.

Here, an algorithm in GPS will be described as an example. In GPS, the positioning signal includes ephemeris data and almanac data. The ephemeris data is orbital data indicating the correct position of a satellite to be used for position computation. The ephemeris data is satellite-specific data used only by the satellite of a satellite number included in the positioning signal. The almanac data is simple orbital data of all satellites operated in GPS, and is used by a receiver to find a visible satellite.

The CPU 312 estimates the position of each satellite, based on the backed-up almanac data and the current time. The CPU 312 then identifies and tracks a visible satellite, and acquires the ephemeris data and the almanac data by decoding the positioning signal of the visible satellite. The CPU 312 backs up the almanac data. It is to be noted that the almanac data may be stored in the receiving circuit 200 in advance of factory shipment.

The CPU 312 acquires the positions of the respective visible satellites based on the ephemeris data, and calculates the current position of the receiver based on these positions. The current position may be calculated, for example, using the following expressions 6 to 13, based on the Pythagorean theorem.

$$R_1 = c \times (t_1 - t_0) \qquad \qquad 6$$

$$R_2 = c \times (t_2 - t_0) \qquad \qquad 7$$

$$R_3 = c \times (t_3 - t_0) \qquad \qquad 8$$

$$R_4 = c \times (t_4 - t_0) \qquad \qquad 9$$

$$(X_1 - x)^2 + (Y_1 - y)^2 + (Z_1 - z)^2 = (R_1 + s + \Delta r_1)^2 \qquad 10$$

$$(X_2 - x)^2 + (Y_2 - y)^2 + (Z_2 - z)^2 = (R_2 + s + \Delta r_2)^2 \qquad 11$$

$$(X_3 - x)^2 + (Y_3 - y)^2 + (Z_3 - z)^2 = (R_3 + s + \Delta r_3)^2 \qquad 12$$

$$(X_4 - x)^2 + (Y_4 - y)^2 + (Z_4 - z)^2 = (R_4 + s + \Delta r_4)^2 \qquad 13$$

In the expressions 6 to 9, "$R_i$" ("i" is an integer of 1 to 4) is a pseudorange from a satellite $S_i$ to the receiver, and the unit may be, for example, meter (m). "$t_0$" is a base time. "$t_i$"

is the time when the positioning signal is received from the satellite $S_i$, based on $t_0$. The unit of "$t_0$" and "$t_i$" may be, for example, second (s). "c" is a velocity of light, and is about $3.0 \times 10^8$ meters per second (m/s).

In addition, in the expressions 10 to 12, (x, y, z) are three-dimensional coordinates of the receiver, in an earth-centered rectangular coordinate system. $(X_i, Y_i, Z_i)$ are three-dimensional coordinates of the satellite $S_i$ in the earth-centered rectangular coordinate system. "s" is an error in the distance from the satellite to the receiver, which occurs due to an error in the time of the real-time clock 317. "$\Delta r_i$" is an error in the distance, which occurs due to refraction of a radio wave from the satellite S, in the ionosphere and the troposphere. The unit of "s" and "$\Delta r_i$" may be, for example, meter (m).

Further, in the expressions 6 to 13, $R_i$, $(X_i, Y_i, Z_i)$, and $\Delta r_i$ are determined based on the positioning signal of the satellite $S_i$. Therefore, in the expressions 6 to 13, unknowns are four of (x, y, x) and s. Hence, the CPU 312 is allowed to determine the position of the receiver, by acquiring the positioning signals from at least four visible satellites, and then generating and solving four simultaneous equations (the expressions 10 to 13). It is to be noted that, in a case, e.g. when there is no error in the clock of the receiver, it is not necessary to find "s", and therefore the position of the receiver is determined based on the positioning signals of at least three visible satellites.

The CPU 312 converts the determined coordinates (x, y, z) to coordinates including a longitude, a latitude, and an altitude, and outputs the positional information including these coordinates to the outside of the receiving circuit 200, through the external interface 315.

Further, in switching the algorithm used to perform the processing of the positioning signal according to the baseband control signal, the CPU 312 starts the processing of the positioning signal after a lapse of the lock-up time following the time when the switching is ordered. This is because, as described above, the phase of the positioning signal with the switched frequency becomes stable only after the lapse of the lock-up time.

The ROM 313 stores a program executed by the CPU 312. The bus 314 is a common channel for data exchange between the correlator 311, the CPU 312, the ROM 313, the external interface 315, the RAM 316, and the real-time clock 317. The external interface 315 is an interface used by the baseband section 310 to transmit the positional information and receive the baseband control signal. The RAM 316 holds the data generated in the CPU 312, the positioning signal, and the like. The real-time clock 317 times and supplies the current time of the receiver to the CPU 312.

FIG. 5 is a diagram illustrating an example of control contents for each frequency band in the first embodiment. The types of GNSSs used by the receiving circuit 200 are assumed to be GPS, GLONASS, and COMPASS. The carrier frequency Frf in the L1 band of GPS is 1573.374 MHz to 1577.466 MHz. The carrier frequency Frf in the L1 band of GLONASS is 1597.552 MHz to 1605.886 MHz. Further, the carrier frequency of a B1 signal in the positioning signal of COMPASS is 1559.052 MHz to 1563.144 MHz. The time slot is assigned to each of these frequency bands.

In the time slot of GPS, the impedance (for example, the capacitive reactance) of the antenna 100 is controlled to Xc1 (Ω). The resonance frequency of the antenna 100 when the impedance is Xc1 is switched to the center frequency in the L1 band of GPS.

Further, in the time slot of GLONASS, the impedance of the antenna 100 is controlled to Xc2 (Ω), and the resonance frequency thereof is switched to the center frequency in the L1 band of GLONASS. In the time slot of COMPASS, the impedance of the antenna 100 is controlled to Xc3 (Ω), and the resonance frequency thereof is switched to the center frequency in the carrier frequency band of the B1 signal of COMPASS.

On the other hand, in the time slot of GPS, the local oscillation frequency Flo is controlled to the difference (for example, 1575.42 MHz) between the resonance frequency of the antenna 100 after the switching (i.e. the center frequency of GPS) and the baseband frequency Fbb. In the time slot of GLONASS, the local oscillation frequency Flo is controlled to the difference (for example, 1601.70 MHz) between the center frequency of GLONASS and the baseband frequency Fbb. In the time slot of COMPASS, the local oscillation frequency Flo is controlled to the difference (for example, 1561.00 MHz) between the center frequency of COMPASS and the baseband frequency Fbb.

Further, in the time slot of GPS, an algorithm 1 used to perform the processing of the positioning signal of GPS is employed. In the time slot of GLONASS, an algorithm 2 used to perform the processing of the positioning signal of GLONASS is employed. In the time slot of COMPASS, an algorithm 3 used to perform the processing of the positioning signal of COMPASS is employed.

It is to be noted that, as described above, the baseband section 310 is allowed to estimate the quantity of visible satellites for each of the carrier frequency bands, based on the almanac data and the current time. The baseband section 310 may supply the quantity of visible satellites to the control section 270. In this case, the control section 270 may compare the quantities of visible satellites of the respective GPS, GLONASS, and COMPASS with one another, and assign the time slot to the carrier frequency band for a large quantity of visible satellites by giving a higher priority thereto than to the carrier frequency band for a small quantity of visible satellites.

For example, assume receiving is initially performed by assigning the time slots equally to GPS, GLONASS, and COMPASS, but the quantity of visible satellites of GPS becomes the largest at some point in time. In this case, the control section 270 may increase the quantity of time slots to be assigned to GPS, to be made larger than those to other two systems. Alternatively, the control section 270 may increase the length of the time slot of GPS, to be made longer than those of other two systems. The more the visible satellites are, the more the positioning accuracy improves. Therefore, the positioning accuracy is improved by receiving the carrier frequency band of the system with many visible satellites.

[Operation Example of Receiving Circuit]

Figure 6A:
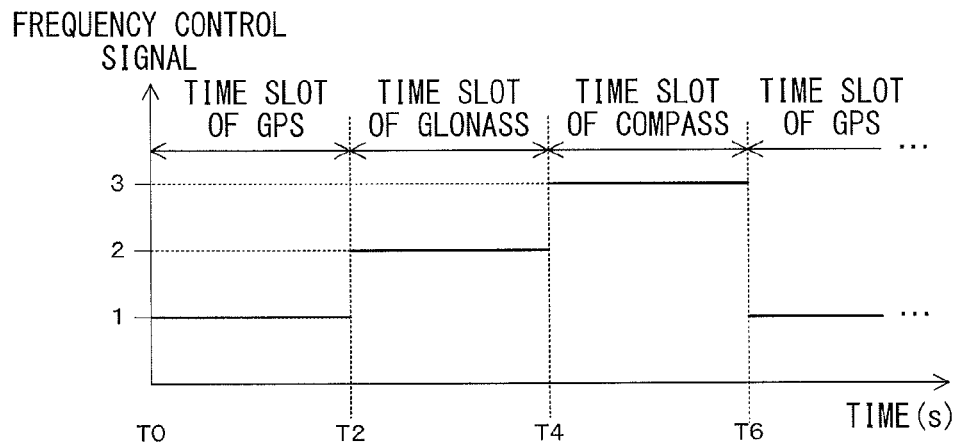
FIGS. 6A to 6C are diagrams illustrating an example of operation of the control section, that of the frequency conversion section, and that the baseband section, in the first embodiment, respectively.
Figure 6B:
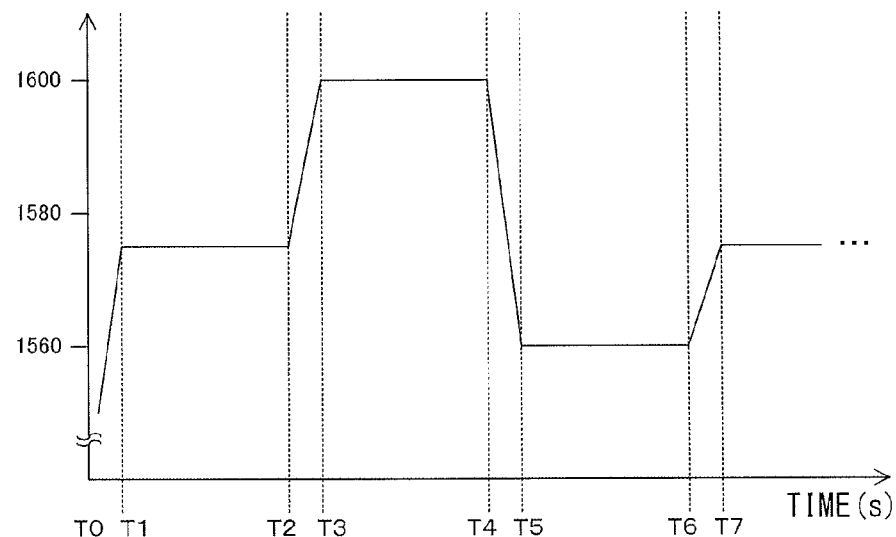
Figure 6C:
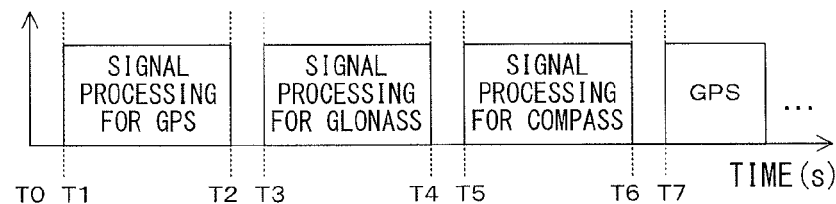

FIGS. 6A to 6C are diagrams illustrating examples of operation of the control section 270, the frequency conversion section 230, and the baseband section 310 in the first embodiment. FIG. 6A is a diagram illustrating an example of the operation of the control section 270. In FIG. 6A, a vertical axis represents the value of the frequency control signal, and a horizontal axis represents the time.

Here, the time slot of T0 to T2 is assumed to be assigned to the carrier frequency band of GPS. Further, the time slot of T2 to T4 is assumed to be assigned to the carrier frequency band of GLONASS, and the time slot of T4 to T6 is assumed to be assigned to the carrier frequency band of COMPASS. The time slot is assumed to be assigned to GPS, GLONASS, and COMPASS in this order, after T6 likewise.

The lengths of the respective time slots may be, for example, the same. It is to be noted that, when the amount of data necessary for the positioning is different for each system, the time slot having a different length may be assigned to each system.

In the time slot of GPS, the control section 270 generates the frequency control signal of a value (for example, "1") indicating that the local oscillation frequency Flo is to be controlled to be the difference between the carrier frequency Frf of GPS and the baseband frequency Fbb. Subsequently, in the time slot of GLONASS, the control section 270 generates the frequency control signal of a value (for example, "2") indicating that the local oscillation frequency Flo is to be controlled to be the difference between the carrier frequency Frf of GLONASS and the baseband frequency Fbb. In the time slot of COMPASS, the control section 270 generates the frequency control signal of a value (for example, "3") indicating that the local oscillation frequency Flo is to be controlled to be the difference between the carrier frequency Frf of COMPASS and the baseband frequency Fbb. The impedance control signal and the baseband control signal are also generated in similar timing.

It is to be noted that the processing of the positioning signal in the baseband section 310 begins after the lapse of the lock-up time. Therefore, the control section 270 may transmit the baseband control signal of ordering the switching of the algorithm, after the lapse of the lock-up time following the switching of the frequency. Similarly, the control section 270 may transmit the impedance control signal of ordering the switching, after the lapse of the lock-up time following the switching of the frequency. In other words, with respect to the switching timing of the frequency control signal, the switching timing of each of the impedance control signal and the baseband control signal may be delayed by the length of the lock-up time.

FIG. 6B is a diagram illustrating an example of the operation of the frequency conversion section 230. In FIG. 6B, a vertical axis represents the local oscillation frequency Flo, and a horizontal axis represents the time. In the time slot of GPS, the frequency conversion section 230 controls the local oscillation frequency Flo to be the difference (for example, 1575.42 MHz) between the carrier frequency Frf of GPS and the baseband frequency Fbb, according to the frequency control signal. At the time T2 when the time slot of GPS passes, the frequency conversion section 230 switches the local oscillation frequency Flo to the difference (for example, 1601.70 MHz) between the carrier frequency Frf of GLONASS and the baseband frequency Fbb, according to the frequency control signal. The phase of the signal after the switching of the frequency is stable at the time T3 after the lapse of the lock-up time.

Subsequently, at the time T4 when the time slot of GLONASS passes, the frequency conversion section 230 switches the local oscillation frequency Flo to the difference (for example, 1561.00 MHz) between the carrier frequency Frf of COMPASS and the baseband frequency Fbb, according to the frequency control signal. The phase of the signal after the switching of the frequency is stable at the time T5 after the lapse of the lock-up time.

FIG. 6C is a diagram illustrating an example of the operation of the baseband section 310. At the time T1 after the lapse of the lock-up time following the start of the time slot of GPS, the baseband section 310 starts the processing of the positioning signal by using the algorithm corresponding to GPS. Subsequently, at the time T2 when the time slot of GPS passes, the baseband section 310 stops the processing. At the time T3 after the lapse of the lock-up time following the time T2, the baseband section 310 starts the processing of the positioning signal by using the algorithm corresponding to GLONASS. Subsequently, at the time T4 when the time slot of GLONASS passes, the baseband section 310 stops the processing. At the time T5 after the lapse of the lock-up time following the time T4, the baseband section 310 starts the processing of the positioning signal by using the algorithm corresponding to COMPASS. In this way, between the lock-up times, the baseband section 310 stops the processing of the positioning signal. This is because, between the lock-up times, the phase of the positioning signal may not be stable, and the signal of the carrier frequency band after the switching may not be received accurately.

[Operation Example of Receiving Circuit]

Figure 7:
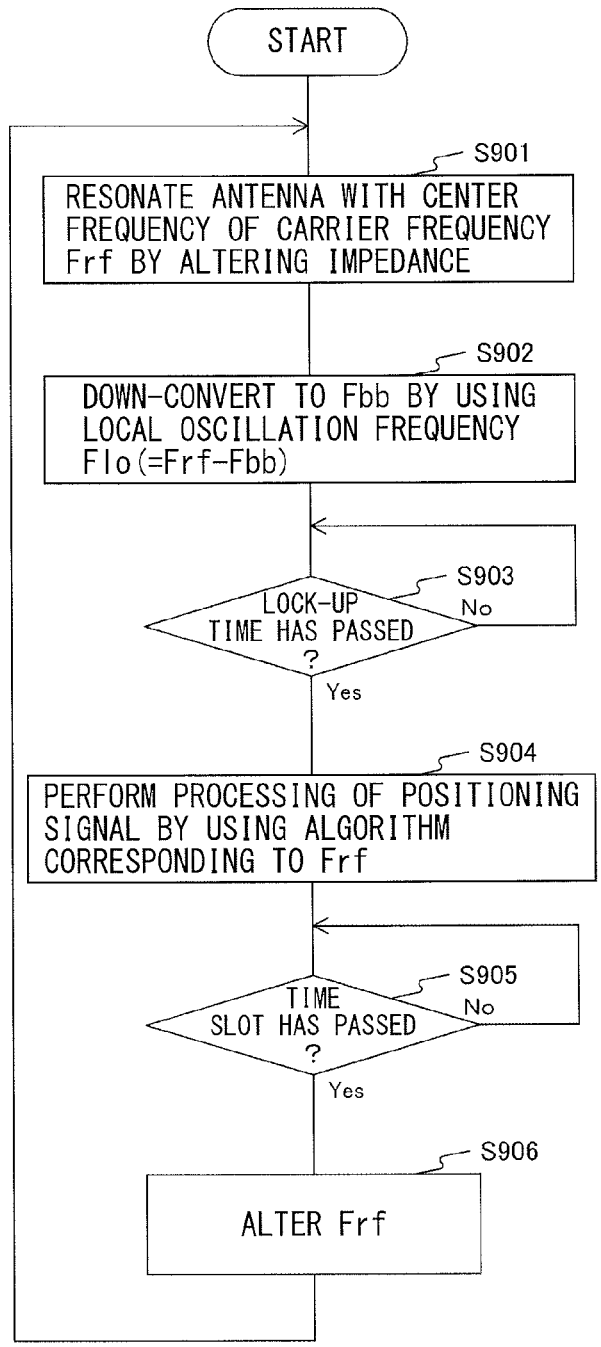
FIG. 7 is a flowchart presenting an example of operation of the receiving circuit in the first embodiment.

FIG. 7 is a flowchart presenting an example of operation of the receiving circuit 200 in the first embodiment. For example, this operation may start when the receiving circuit 200 is ordered to start receiving the positioning signal. The receiving circuit 200 resonates the antenna 100 with the center frequency of the carrier frequency Frf corresponding to the time slot, by controlling the impedance of the antenna 100 (step S901).

The receiving circuit 200 controls the local oscillation frequency Flo to the difference between the carrier frequency Frf corresponding to the time slot and the baseband frequency Fbb, and down-converts the carrier frequency Frf by using the local oscillation frequency Flo (step S902). The receiving circuit 200 determines whether or not the lock-up time has passed, to determine whether or not the local oscillation frequency Flo is stable (step S903). When the local oscillation frequency Flo is not stable (step S903: No), the receiving circuit 200 returns to step S903.

When the local oscillation frequency Flo is stable (step S903: Yes), the receiving circuit 200 performs the processing of the positioning signal by using the algorithm corresponding to the current carrier frequency Frf (step S904). The receiving circuit 200 determines whether or not the time slot has passed (step S905). When the time slot has not passed (step S905: No), the receiving circuit 200 returns to step S905.

When the time slot has passed (step S905: Yes), the receiving circuit 200 alters the carrier frequency Frf corresponding to the next time slot, to a target to be received (step S906), and returns to step S901.

In this way, according to the first embodiment of the present technology, the receiving circuit 200 selects the plurality of frequency bands sequentially, to switch the resonance frequency of the antenna and the local oscillation frequency in response to the selected band. Therefore, it is possible to receive the signals in the plurality of frequency bands with high sensitivity. In addition, the signals are received by selecting the frequency bands sequentially (i.e. time-divisionally), and therefore it is not necessary to provide a mixer and a filter for each frequency band, which allows reductions in circuit scale and power consumption.

[2. Second Embodiment]

[Configuration Example of Receiving Circuit]

In the first embodiment, the positioning signal is not held, and therefore in a case in which the time slot is short or a radio wave environment is poor, the data necessary for the positioning in the positioning signal may not be received within the time slot. For this reason, desirably, the receiving circuit 200 may hold the positioning signal in each of the time slots. The receiving circuit 200 of a second embodiment is different from that of the first embodiment, in that the positioning signal is held.

Figure 8:
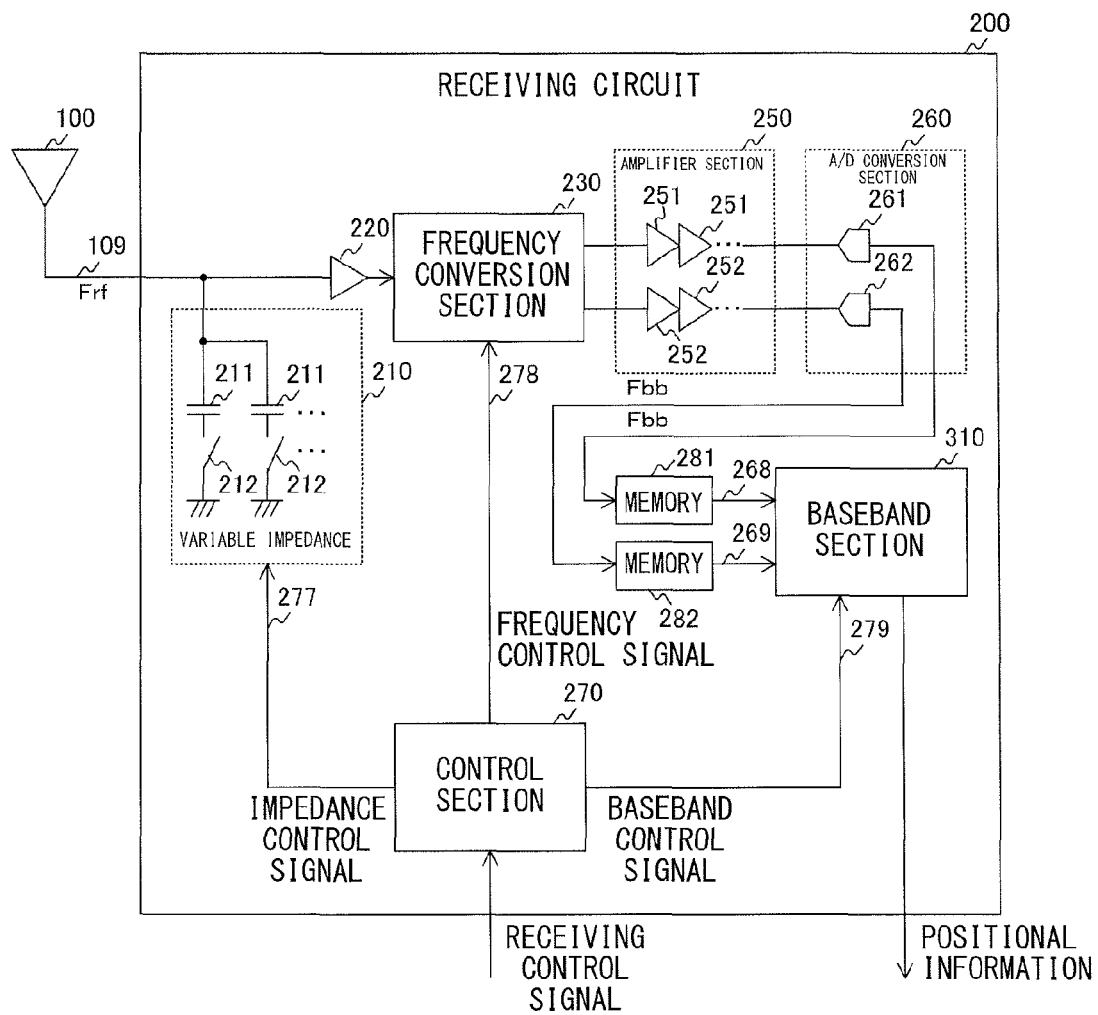
FIG. 8 is a block diagram illustrating a configuration example of a receiving circuit in a second embodiment.

FIG. 8 is a block diagram illustrating a configuration example of the receiving circuit 200 in the second embodiment. The receiving circuit 200 of the second embodiment is different from that of the first embodiment, in that memories 281 and 282 are further provided.

The A/D conversion section 260 allows the memory 281 and the memory 282 to hold the I signal and the Q signal of the positioning signal, respectively.

The data of the positioning signal received in each time slot is held in each of the memories 281 and 282. The baseband section 310 reads the data within the time slot assigned to the same frequency band, from each of the memories 281 and 282, and performs processing of the read data.

For example, in GPS, the positioning signal carries navigation message data including 25 frames. This navigation message data includes the ephemeris data and the almanac data. Each of these frames includes 5 sub-frames, and therefore the navigation message data includes 125 sub-frames. A satellite transmits one sub-frame in six seconds. Therefore, for example, when the time slot is shorter than 6 seconds, e.g. 0.5 second, the receiving circuit 200 may divide one sub-frame, and receive individual data obtained by the division, within the time slot.

The receiving circuit 200 reads the data, which has been received in the plurality of time slots of GPS after being divided, from the memories 281 and 282, and synthesizes the read data, to acquire each of the sub-frames. Further, when the data has not been received within a certain time slot of GPS, the baseband section 310 reads the data received in the past time slot of GPS from the memories 281 and 282, and attempts to interpolate the data that has not been received.

According to the second embodiment of the present technology, the receiving circuit 200 holds the data of the positioning signal by dividing this data, and therefore, it is possible to hold the data even if the time slot is short.

[Modification]

In the second embodiment, the receiving circuit 200 holds the positioning signals of the different systems in the same memory. However, different memories may be provided for the respective systems to hold the positioning signal. The receiving circuit 200 of a modification is different from that of the second embodiment, in that the positioning signal is held in a different memory for each system.

Figure 9:
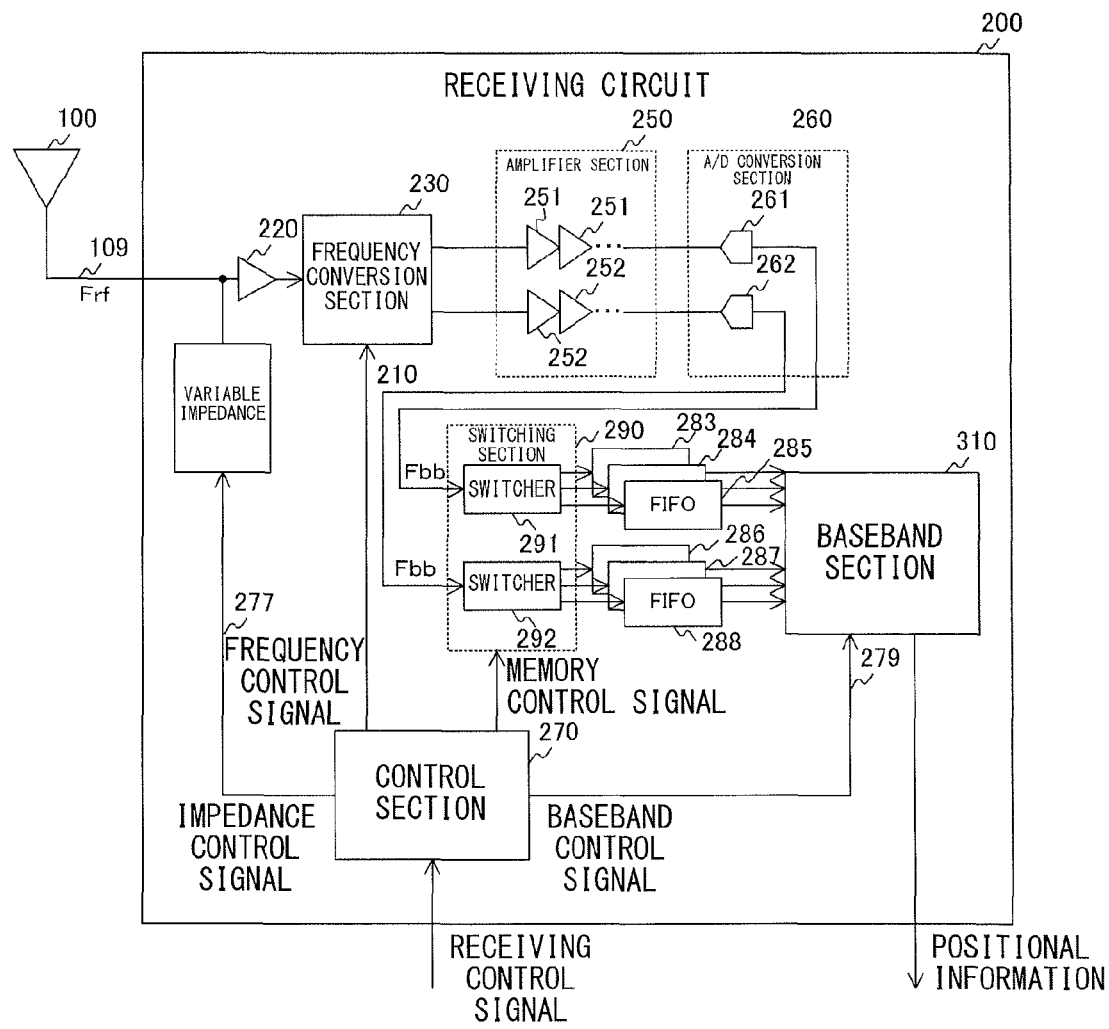
FIG. 9 is a block diagram illustrating a configuration example of a receiving circuit in a modification of the second embodiment.

FIG. 9 is a block diagram illustrating a configuration example of the receiving circuit 200 in the modification of the second embodiment. The receiving circuit 200 of the modification is different from that of the second embodiment, in that a switching section 290 and FIFO memories 283 to 288 are further provided.

Further, the receiving circuit 200 of the modification generates a memory control signal, and supplies the generated memory control signal to the switching section 290. The memory control signal is used to control a destination of saving of the positioning signal.

The switching section 290 includes switcher 291 and 292. The switcher 291 switches the destination of saving of the I signal, according to the memory control signal. The switcher 292 switches the destination of saving of the Q signal, according to the memory control signal.

The FIFO memory 283 holds the I signal of GPS in a FIFO (First In First Out) method. The FIFO memory 284 holds the I signal of GLONASS in the FIFO method, and the FIFO memory 285 holds the I signal of COMPASS in the FIFO method.

The FIFO memory 286 holds the Q signal of GPS in the FIFO method. The FIFO memory 287 holds the Q signal of GLONASS in the FIFO method, and the FIFO memory 288 holds the Q signal of COMPASS in the FIFO method.

The baseband section 310 of the modification reads the positioning signal from the FIFO memories 283 and 286 in the time slot of GPS. Further, the baseband section 310 reads the positioning signal from the FIFO memories 284 and 287 in the time slot of GLONASS, and reads the positioning signal from the FIFO memories 285 and 288 in the time slot of COMPASS.

According to the modification, the receiving circuit 200 thus holds the data in the memories provided for each frequency band, and therefore it is possible to acquire the data for each system easily.

[3. Third Embodiment]

[Configuration Example of Receiving Circuit]

In the first embodiment, the receiving circuit 200 directly converts the carrier frequency of the positioning signal to the baseband frequency. However, the carrier frequency of the positioning signal may be converted to the baseband frequency to the baseband frequency, after being converted to an intermediate frequency. The receiving circuit 200 of a third embodiment is different from that of the first embodiment, in that the carrier frequency is converted to the intermediate frequency.

Figure 10:
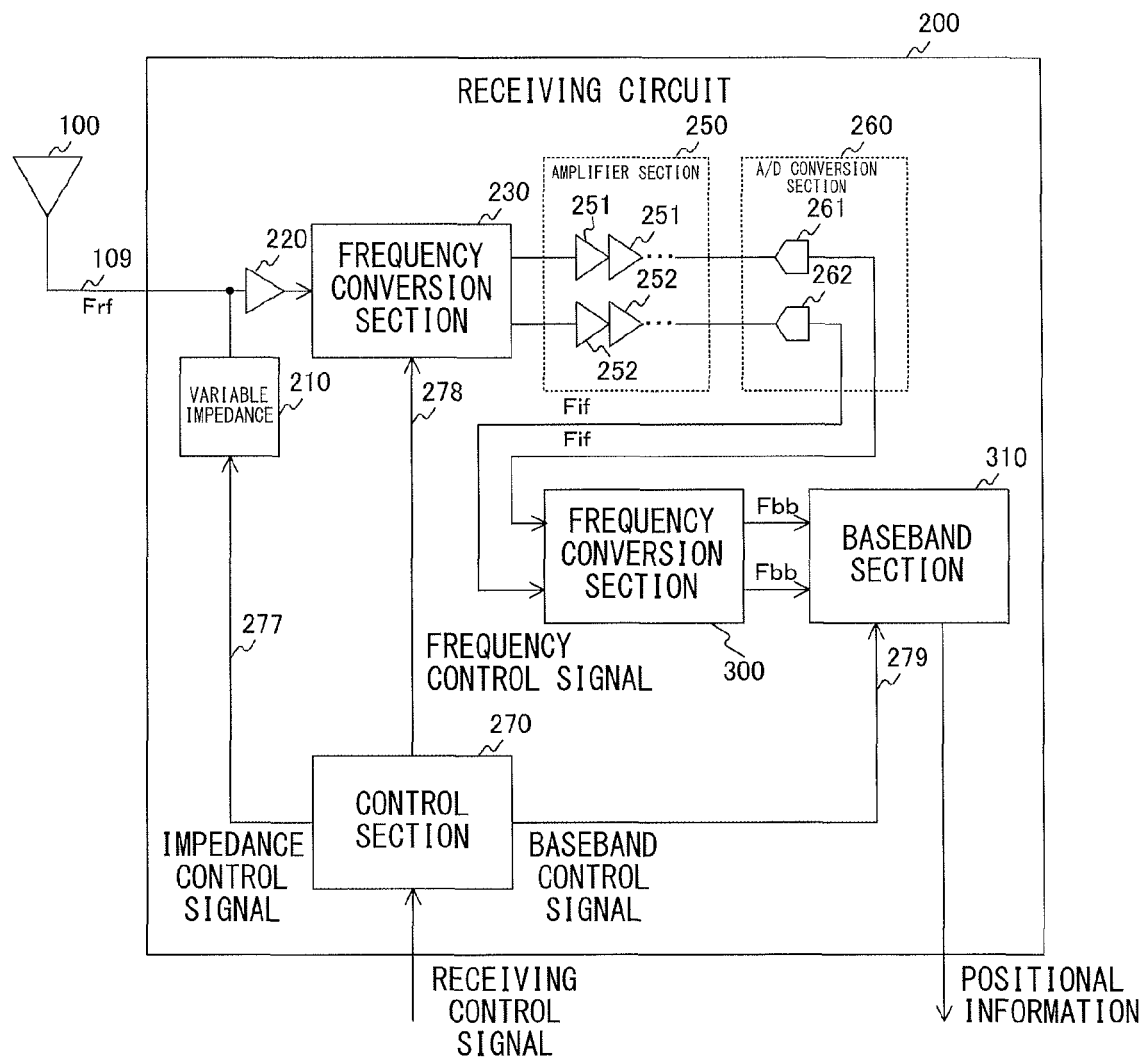
FIG. 10 is a block diagram illustrating a configuration example of a receiving circuit in a third embodiment.

FIG. 10 is a block diagram illustrating a configuration example of the receiving circuit 200 in the third embodiment. The receiving circuit 200 of the third embodiment is different from that of the first embodiment, in that a frequency conversion section 300 is further provided.

The frequency conversion section 230 of the third embodiment is different from that of the first embodiment, in that the carrier frequency of the positioning signal is converted to the intermediate frequency.

The frequency conversion section 300 converts the intermediate frequency to the baseband frequency. The frequency conversion section 300 has a configuration similar to that of the frequency conversion section 230, except that the local oscillation frequency is a fixed value without being controlled. The frequency conversion section 300 amplifies the positioning signal converted to the baseband frequency, as necessary, and supplies the amplified positioning signal to the baseband section 310.

As illustrated in FIG. 10, a method of converting the carrier frequency to the baseband frequency after converting the carrier frequency to the intermediate frequency is called a super-heterodyne system. The frequency of the signal is lowered by being converted to the intermediate frequency. Therefore, the signal is readily handled, and a high amplification gain is easily obtained.

In this way, according to the third embodiment of the present technology, the receiving circuit 200 converts the carrier frequency to the intermediate frequency, and therefore it is possible to increase the amplification gain easily.

[4. Fourth Embodiment]

[Configuration Example of Receiving Device]

Figure 11:
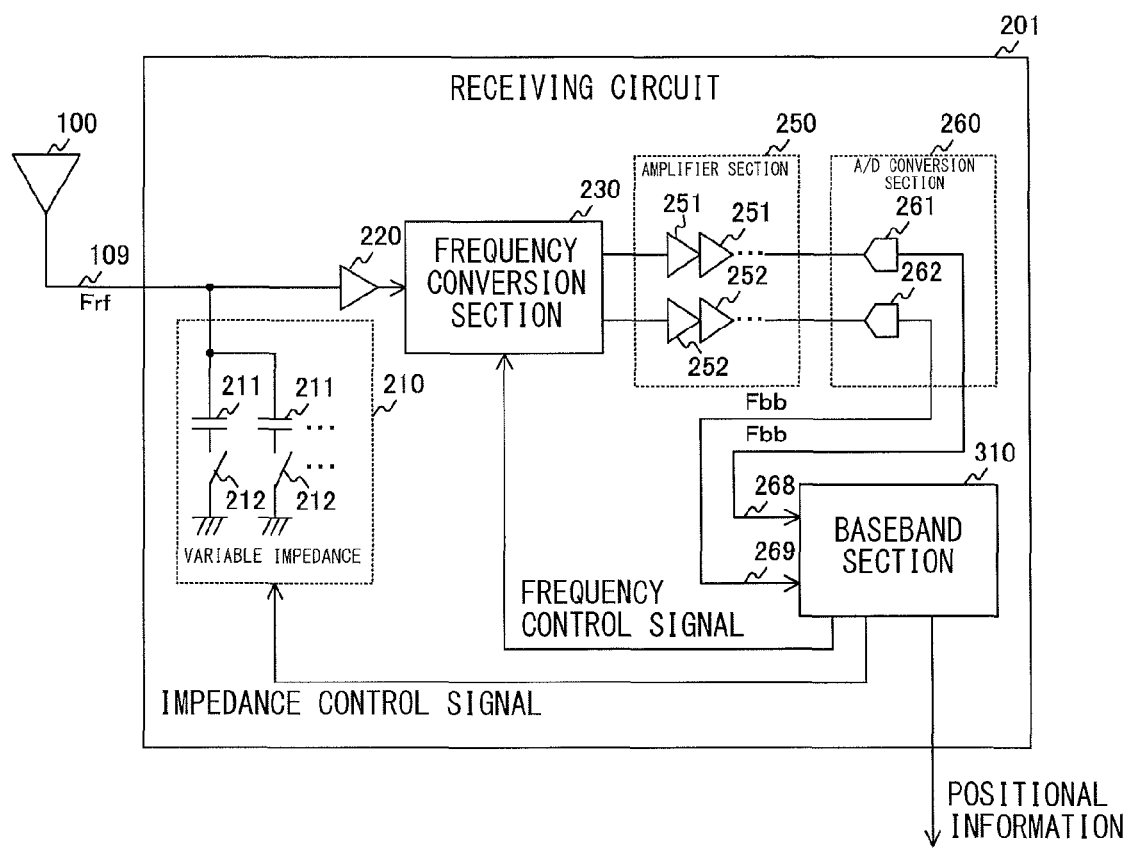
FIG. 11 is a block diagram illustrating a configuration example of a receiving device in a fourth embodiment.

FIG. 11 is a block diagram illustrating a configuration example of a receiving device 201 in a fourth embodiment. In the first embodiment, there is provided the configuration in which the control section 270 provided outside the baseband section 310 performs the frequency control and the impedance control, but the baseband section 310 may perform these kinds of control. The receiving device 201 of the fourth embodiment is different from the receiving circuit 200 of the first embodiment, in that the control section 270 is not provided, and the baseband section 310 performs the frequency control and the impedance control.

The baseband section 310 executes baseband processing of generating the positional information by performing the processing of the positioning signal. Besides, the baseband section 310 performs the frequency control and the impedance control by generating the frequency control signal and the impedance control signal.

It is to be noted that there is provided the configuration in which the antenna 100 is provided outside the receiving device 201, but the present modification is not limited to this configuration. For example, the antenna 100 may be incorporated in the receiving device 201, or the receiving device 201 and the antenna 100 may be configured to be combined in one unit.

[Configuration Example of Baseband Section]

Figure 12:
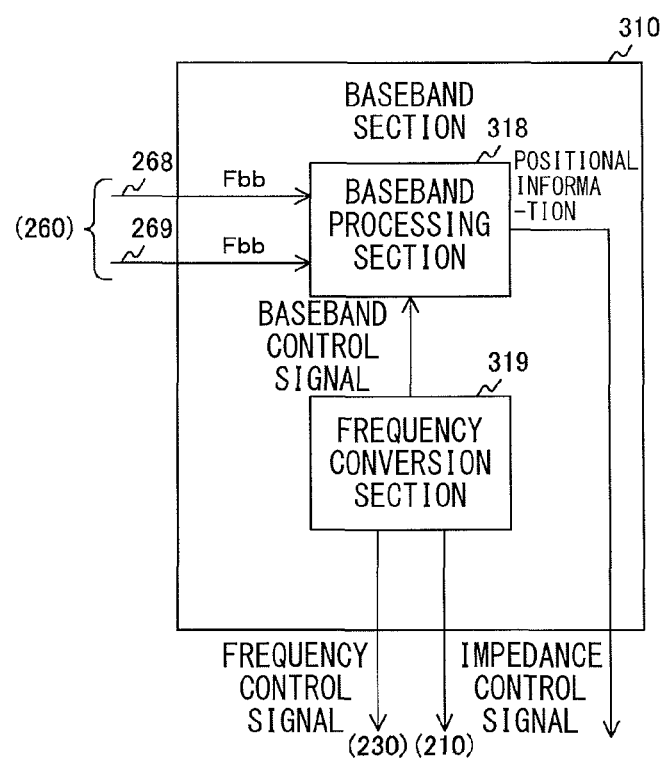
FIG. 12 is a block diagram illustrating an example of a functional configuration of a baseband section in the fourth embodiment.

FIG. 12 is a block diagram illustrating an example of a functional configuration of the baseband section 310 in the fourth embodiment. The baseband section 310 includes a baseband processing section 318 and a frequency control section 319. It is to be noted that the baseband section 310 is a specific but not limitative example of "control section" in one embodiment of the present technology.

The baseband processing section 318 generates the positional information by performing processing of the positioning signal. The baseband processing section 318 in FIG. 12 is implemented using elements such as the correlator 311, the CPU 312, the ROM 313, the bus 314, the external interface 315, the RAM 316, and the real-time clock 317 in FIG. 4.

The frequency control section 319 has a configuration similar to that of the control section 270 in the first embodiment, except that in place of the baseband section 310, the baseband processing section 318 is controlled. The frequency control section 319 in FIG. 12 is implemented using elements such as the CPU 312, the ROM 313, the bus 314, the external interface 315, the RAM 316, and the real-time clock 317 in FIG. 4.

In this way, according to the fourth embodiment of the present technology, the baseband section 310 performs the frequency control and the impedance control, and therefore it is not necessary to provide the control section 270 separately from the baseband section 310.

It is to be noted that each of the above-described embodiments is an example used to embody the present technology, and the elements in each of the above-described embodiments correspond to elements in one embodiment of the present technology. Similarly, elements in one embodiment of the present technology correspond to the elements provided with the same designations as those thereof in each of the above-described embodiments. However, the present technology is not limited to the above-described embodiments, and may be embodied by variously modifying the above-described embodiments in the scope not deviating from the gist thereof.

In addition, a series of procedures described in each of the above-described embodiments may be interpreted as a method of having the series of procedures, or may be interpreted as a program allowing a computer to execute the series of procedures, or as a recording medium storing such a program. Usable examples of this recording medium may include CD (Compact Disc), MD (MiniDisc), DVD (Digital Versatile Disc), memory card, and Blu-ray Disc (registered trademark).

Furthermore, the technology encompasses any possible combination of some or all of the various embodiments described herein and incorporated herein.

It is possible to achieve at least the following configurations from the above-described example embodiments of the disclosure.

(1) A receiving circuit, including:

a mixing section configured to mix a local oscillation signal with a positioning signal that is received by an antenna within a constant receiving frequency band that includes a resonance frequency of the antenna, and output a mixed signal of the local oscillation signal and the positioning signal; and a control section configured to sequentially select any of a plurality of carrier frequency bands used in the positioning signal, and configured to switch the resonance frequency of the antenna to a specific frequency within the selected carrier frequency band, and switch a frequency of the local oscillation signal, based on the specific frequency and a frequency of the mixed signal.

(2) The receiving circuit according to (1), further including a baseband section configured to generate, based on the mixed signal, positional information indicating a position of the receiving circuit, when a phase of the local oscillation signal is synchronized with a predetermined reference phase, wherein, the mixing section mixes the positioning signal with the local oscillation signal in which the phase of the local oscillation signal is synchronized with the predetermined reference phase, and outputs the mixed signal of the local oscillation signal having the synchronized phase and the positioning signal.

(3) The receiving circuit according to (2), wherein the baseband section estimates, based on orbital data of a satellite and a current time, a quantity of visible satellites for each of the carrier frequency bands, and the control section selects the carrier frequency band for the visible satellites whose quantity is large, by giving a higher priority thereto than to the carrier frequency band for the visible satellites whose quantity is small.

(4) The receiving circuit according to any one of (1) to (3), wherein the control section changes an impedance of the antenna to switch the resonance frequency of the antenna.

(5) The receiving circuit according to (4), wherein the impedance includes one or both of capacitive reactance and inductive reactance.

(6) The receiving circuit according to any one of (1) to (5), wherein the mixing section allows the mixed signal to pass through a low pass filter that cuts off a frequency component higher than a cut-off frequency, and outputs thereafter the mixed signal having passed through the low pass filter, and the control section switches the resonance frequency of the antenna and switches the frequency of the local oscillation signal, and further switches the cut-off frequency to a higher value for a wider bandwidth of the selected carrier frequency band.

(7) The receiving circuit according to any one of (2) to (6), further including a holding section configured to hold, each time the carrier frequency band corresponding to the mixed signal is selected, any of a plurality of pieces of divisional data, the plurality of pieces of divisional data being a division of unit data in the mixed signal, wherein the baseband section acquires the unit data, based on each of the pieces of divisional data held in the holding section, to generate the positional information.

(8) The receiving circuit according to any one of (2) to (7), further including a holding section configured to hold, for each of the carrier frequency bands, a plurality of pieces of divisional data, the plurality of pieces of divisional data being a division of unit data in the mixed signal,
wherein the baseband section acquires the unit data for each of the carrier frequency bands, based on each of the pieces of divisional data held in the holding section, to generate the positional information.
(9) The receiving circuit according to any one of (1) to (8), further including a frequency conversion section configured to convert the frequency of the mixed signal.
(10) A receiving device, including:
a mixing section configured to mix a local oscillation signal with a positioning signal that is received by an antenna within a constant receiving frequency band that includes a resonance frequency of the antenna, and output a mixed signal of the local oscillation signal and the positioning signal; and
a control section configured to sequentially select any of a plurality of carrier frequency bands used in the positioning signal, and configured to switch the resonance frequency of the antenna to a specific frequency within the selected carrier frequency band, and switch a frequency of the local oscillation signal, based on the specific frequency and a frequency of the mixed signal.
(11) The receiving device according to (10), wherein the control section includes:
a frequency control section configured to switch the resonance frequency of the antenna and switch the frequency of the local oscillation signal; and
a baseband processing section configured to generate positional information indicating a position of the receiving device, based on the mixed signal.
(12) The receiving device according to (11), wherein
the mixing section mixes the positioning signal with the local oscillation signal in which the phase of the local oscillation signal is synchronized with the predetermined reference phase, and outputs the mixed signal of the local oscillation signal having the synchronized phase and the positioning signal, and
the baseband processing section generates, based on the mixed signal, the positional information indicating the position of the receiving device, when the phase of the local oscillation signal is synchronized with the predetermined reference phase.
(13) The receiving device according to (11) or (12), wherein
the baseband processing section estimates, based on orbital data of a satellite and a current time, a quantity of visible satellites for each of the carrier frequency bands, and
the control section selects the carrier frequency band for the visible satellites whose quantity is large, by giving a higher priority thereto than to the carrier frequency band for the visible satellites whose quantity is small.
(14) The receiving device according to any one of (11) to (13), further including a holding section configured to hold, each time the carrier frequency band corresponding to the mixed signal is selected, any of a plurality of pieces of divisional data, the plurality of pieces of divisional data being a division of unit data in the mixed signal,
wherein the baseband processing section acquires the unit data, based on each of the pieces of divisional data held in the holding section, to generate the positional information.
(15) The receiving device according to any one of (11) to (13), further including a holding section configured to hold, for each of the carrier frequency bands, a plurality of pieces of divisional data, the plurality of pieces of divisional data being a division of unit data in the mixed signal,
wherein the baseband processing section acquires the unit data for each of the carrier frequency bands, based on each of the pieces of divisional data held in the holding section, to generate the positional information.
(16) The receiving device according to any one of (10) to (15), further including the antenna.
(17) A receiving method, including:
mixing, by a mixing section, a local oscillation signal with a positioning signal that is received by an antenna within a constant receiving frequency band that includes a resonance frequency of the antenna, and outputting a mixed signal of the local oscillation signal and the positioning signal; and
performing control, by a control section, of sequentially selecting any of a plurality of carrier frequency bands used in the positioning signal, and switching the resonance frequency of the antenna to a specific frequency within the selected carrier frequency band, and switching a frequency of the local oscillation signal, based on the specific frequency and a frequency of the mixed signal.

It should be understood by those skilled in the art that various modifications, combinations, sub-combinations, and alterations may occur depending on design requirements and other factors insofar as they are within the scope of the appended claims or the equivalents thereof.

What is claimed is:
1. A receiving circuit, comprising:
a mixing section configured to mix a local oscillation signal with a positioning signal that is received by an antenna and output a mixed signal of the local oscillation signal and the positioning signal;
a baseband section configured to estimate a quantity of visible satellites for each of a plurality of carrier frequency bands used in the positioning signal; and
a control section configured to select one of the plurality of carrier frequency bands based on the estimation, switch a resonance frequency of the antenna to a specific frequency, and set a frequency of the local oscillation signal,
wherein,
the mixing section is configured to mix the positioning signal with the local oscillation signal in which a phase of the local oscillation signal is synchronized with a predetermined reference phase, and output the mixed signal of the local oscillation signal having the synchronized phase and the positioning signal.
2. The receiving circuit according to claim 1, wherein the baseband section is configured to generate, based on the mixed signal, positional information indicating a position of the receiving circuit in an event the phase of the local oscillation signal is synchronized with the predetermined reference phase,
wherein,
the baseband section is configured to estimate, based on orbital data of a satellite and a current time, the quantity of visible satellites for each of the carrier frequency bands, and
the control section is configured to select the carrier frequency band for the visible satellites whose quantity is large, by giving a higher priority thereto than to the carrier frequency band for the visible satellites whose quantity is small.
3. The receiving circuit according to claim 1, wherein the control section is configured to change an impedance of the antenna to switch the resonance frequency of the antenna.
4. The receiving circuit according to claim 3, wherein the impedance includes one or both of capacitive reactance and inductive reactance.

5. A receiving circuit, comprising:
a mixing section configured to mix a local oscillation signal with a positioning signal that is received by an antenna and output a mixed signal of the local oscillation signal and the positioning signal;
a baseband section configured to estimate a quantity of visible satellites for each of a plurality of carrier frequency bands used in the positioning signal; and
a control section configured to select one of the plurality of carrier frequency bands based on the estimation, switch a resonance frequency of the antenna to a specific frequency, and set a frequency of the local oscillation signal,
wherein:
the mixing section is configured to allow the mixed signal to pass through a low pass filter that is configured to cut off a frequency component higher than a cut-off frequency, and output thereafter the mixed signal having passed through the low pass filter, and
the control section is configured to switch the resonance frequency of the antenna and switch the frequency of the local oscillation signal, and further switch the cut-off frequency to a higher value for a wider bandwidth of the selected carrier frequency band.

6. The receiving circuit according to claim 1, wherein:
the baseband section is configured to generate, based on the mixed signal, positional information indicating a position of the receiving circuit, in an event a phase of the local oscillation signal is synchronized with the predetermined reference phase; and
a holding section configured to hold, each time the carrier frequency band corresponding to the mixed signal is selected, any of a plurality of pieces of divisional data, the plurality of pieces of divisional data being a division of unit data in the mixed signal,
wherein,
the baseband section is configured to acquire the unit data, based on each of the pieces of divisional data held in the holding section, to generate the positional information.

7. The receiving circuit according to claim 1, wherein:
the baseband section configured to generate, based on the mixed signal, positional information indicating a position of the receiving circuit, in an event a phase of the local oscillation signal is synchronized with the predetermined reference phase; and
a holding section configured to hold, for each of the carrier frequency bands, a plurality of pieces of divisional data, the plurality of pieces of divisional data being a division of unit data in the mixed signal,
wherein,
the baseband section is configured to acquire the unit data for each of the carrier frequency bands, based on each of the pieces of divisional data held in the holding section, to generate the positional information.

8. The receiving circuit according to claim 1, further comprising a frequency conversion section configured to convert a frequency of the mixed signal.

9. A receiving device, comprising:
a mixing section configured to mix a local oscillation signal with a positioning signal that is received by an antenna within a constant receiving frequency band that includes a resonance frequency of the antenna, and output a mixed signal of the local oscillation signal and the positioning signal;
a baseband section configured to estimate a quantity of visible satellites for each of a plurality of carrier frequency bands used in the positioning signal; and
a control section configured to sequentially select one of the plurality of carrier frequency bands based on the estimation, and switch a resonance frequency of the antenna to a specific frequency within the selected carrier frequency band, and switch a frequency of the local oscillation signal, based on the specific frequency and a frequency of the mixed signal,
wherein,
the mixing section is configured to mix the positioning signal with the local oscillation signal in which the phase of the local oscillation signal is synchronized with a predetermined reference phase, and output the mixed signal of the local oscillation signal having the synchronized phase and the positioning signal.

10. The receiving device according to claim 9, wherein the control section includes:
a frequency control section configured to switch the resonance frequency of the antenna and switch the frequency of the local oscillation signal; and
a baseband processing section configured to generate positional information indicating a position of the receiving device, based on the mixed signal.

11. The receiving device according to claim 10, wherein:
the baseband processing section is configured to generate, based on the mixed signal, the positional information indicating the position of the receiving device, in an event the phase of the local oscillation signal is synchronized with the predetermined reference phase.

12. The receiving device according to claim 9, wherein:
the baseband processing section is configured to estimate, based on orbital data of a satellite and a current time, the quantity of visible satellites for each of the carrier frequency bands, and
the control section is configured to select the carrier frequency band for the visible satellites whose quantity is large, by giving a higher priority thereto than to the carrier frequency band for the visible satellites whose quantity is small.

13. The receiving device according to claim 10, further comprising a holding section configured to hold, each time the carrier frequency band corresponding to the mixed signal is selected, any of a plurality of pieces of divisional data, the plurality of pieces of divisional data being a division of unit data in the mixed signal, wherein the baseband processing section is configured to acquire the unit data, based on each of the pieces of divisional data held in the holding section, to generate the positional information.

14. The receiving device according to claim 10, further comprising a holding section configured to hold, for each of the carrier frequency bands, a plurality of pieces of divisional data, the plurality of pieces of divisional data being a division of unit data in the mixed signal, wherein the baseband processing section is configured to acquire the unit data for each of the carrier frequency bands, based on each of the pieces of divisional data held in the holding section, to generate the positional information.

15. The receiving device according to claim 9, further comprising the antenna.

16. A receiving method, comprising:
mixing, by a mixing section, a local oscillation signal with a positioning signal that is received by an antenna within a constant receiving frequency band that includes a resonance frequency of the antenna, and generating a mixed signal of the local oscillation signal and the positioning signal;

estimating, by a baseband section, a quantity of visible satellites for each of a plurality of carrier frequency bands used in the positioning signal;

performing control, by a control section, of sequentially selecting one of the plurality of carrier frequency bands based on the estimation, and switching a resonance frequency of the antenna to a specific frequency within the selected carrier frequency band, and switching a frequency of the local oscillation signal, based on the specific frequency and a frequency of the mixed signal; and mixing, by the mixing section, the positioning signal with the local oscillation signal in which the phase of the local oscillation signal is synchronized with a predetermined reference phase, and outputting the mixed signal of the local oscillation signal having the synchronized phase and the positioning signal.

* * * * *